United States Patent [19]
Chiang

[11] Patent Number: 5,893,606
[45] Date of Patent: Apr. 13, 1999

[54] MULTIFUNCTIONAL CHILDREN GEAR

[76] Inventor: Mao-Chin Chiang, No. 94, Feng Chou Road, Feng Chou Tsun, Shen Kang Hsing, Taichung Hsien, Taiwan

[21] Appl. No.: 08/989,639

[22] Filed: Dec. 12, 1997

[51] Int. Cl.$^6$ .................................................. A47C 13/00
[52] U.S. Cl. .............................. 297/118; 280/30; 280/643; 280/47.41; 297/134; 297/148
[58] Field of Search ...................... 297/130, 256.16, 297/118, 134, 148; 280/30, 642, 643, 38, 641, 658, 657, 47.38, 47.41

[56] References Cited

U.S. PATENT DOCUMENTS

| 8,166 | 4/1851 | Tenney et al. | 297/130 X |
|---|---|---|---|
| 253,320 | 2/1882 | Stevens | 297/130 |
| 292,067 | 1/1884 | Stevens | 297/130 |
| 340,754 | 4/1886 | Bartelle | 297/130 |
| 796,616 | 8/1905 | Thompson | 297/130 |
| 5,133,567 | 7/1992 | Owens | 280/643 X |
| 5,234,224 | 8/1993 | Kim | 280/643 X |

*Primary Examiner*—Peter M. Cuomo
*Assistant Examiner*—Stephen Vu
*Attorney, Agent, or Firm*—Bacon & Thomas, PLLC

[57] ABSTRACT

A multifunctional children's gear generally comprises a chair, a supporting bracket, a pair of front legs, a pair of rear legs, and a pair of handle grips that has a J-shape, a footrest, and four wheels. When projected posts of the supporting bracket are released from the receiving posts of the front legs, the front and rear legs can be folded together and the receiving posts of the front leg can be clamped between the side portion of the rear legs and the J-shape handle grip. Meanwhile, the projected posts of the supporting bracket can be inserted into the receiving holes of the fixing plate respectively to form a table seat. Alternatively, the cushion pad of the chair can be released from the dowel pins of the supporting bracket and the chair can be used as a car seat.

1 Claim, 4 Drawing Sheets

5,893,606

MULTIFUNCTIONAL CHILDREN GEAR

FIELD OF THE INVENTION

The present invention relates to children's gear, more particularly, to multifunctional children's gear that can be readily used as a stroller, car seat, or even a table seat. The children's gear generally comprises a chair, a supporting bracket, a pair of front legs, a pair of rear legs, and a pair of handle grips that has a J-shape. The front and rear legs are configured by an S-shape rod that are symmetrically pivoted by means of a rivet.

DESCRIPTION OF PRIOR ART

The conventionally table seat for young children is only a table seat that can not be used as a stroller or a car seat. Accordingly, the parent needs to purchase an additional stroller and a car seat. This is really a waste and those stroller and car seat take a considerable storing space.

SUMMARY OF THE INVENTION

It is the objective of this invention to provide multifunctional children's gear that can be readily adapted and used as a stroller, car seat, or even a table seat. Accordingly, the cost for stroller or car seat or table seat can be eliminated. The storing space is also reduced.

It is the objective of this invention to provide multifunctional children's gear that can be readily adapted and used as a stroller, car seat, or even a table seat.

In order to achieve the objective set forth, the multifunctional children's gear generally comprises a chair that has four receiving holes on the bottom of the cushion pad. Those four receiving holes can be readily aligned and engaged with four dowel pins located on the top of the supporting bracket. The supporting bracket is provided with a pair of projected post and the rear end of the supporting bracket is pivotally connected with those pair of front legs that has S-shape configuration. The front legs are each provided with a receiving hole corresponding to that of the projected post. The receiving hole could envelope onto the projected post. The front and rear legs are pivotally connected in a scissors-shape. The front end of the front legs is fixedly provided with a fixing plate that has pair of receiving holes corresponding to the projected posts. The rear legs is pivotally mounted with a J-shape handle grip that is adjacent to the fixing plate.

When the projected posts located on the front end of the supporting bracket are released from receiving holes of the front legs, those front and rear legs can be folded together. Besides, those receiving holes of the front legs can be disposed between the side portion of the rear legs and the J-shape handle grips. Meanwhile, the projected posts located on the front bottom of the supporting bracket can be engaged with the receiving holes of the fixing plate. The braking lever can be set to prevent the wheels from moving around. Then a table seat is formed.

When the chair is released from the supporting bracket, the chair can be used as a car seat and disposed onto the car.

DETAILED DESCRIPTION OF PREFERRED EMBODIMENT

Figure 1:
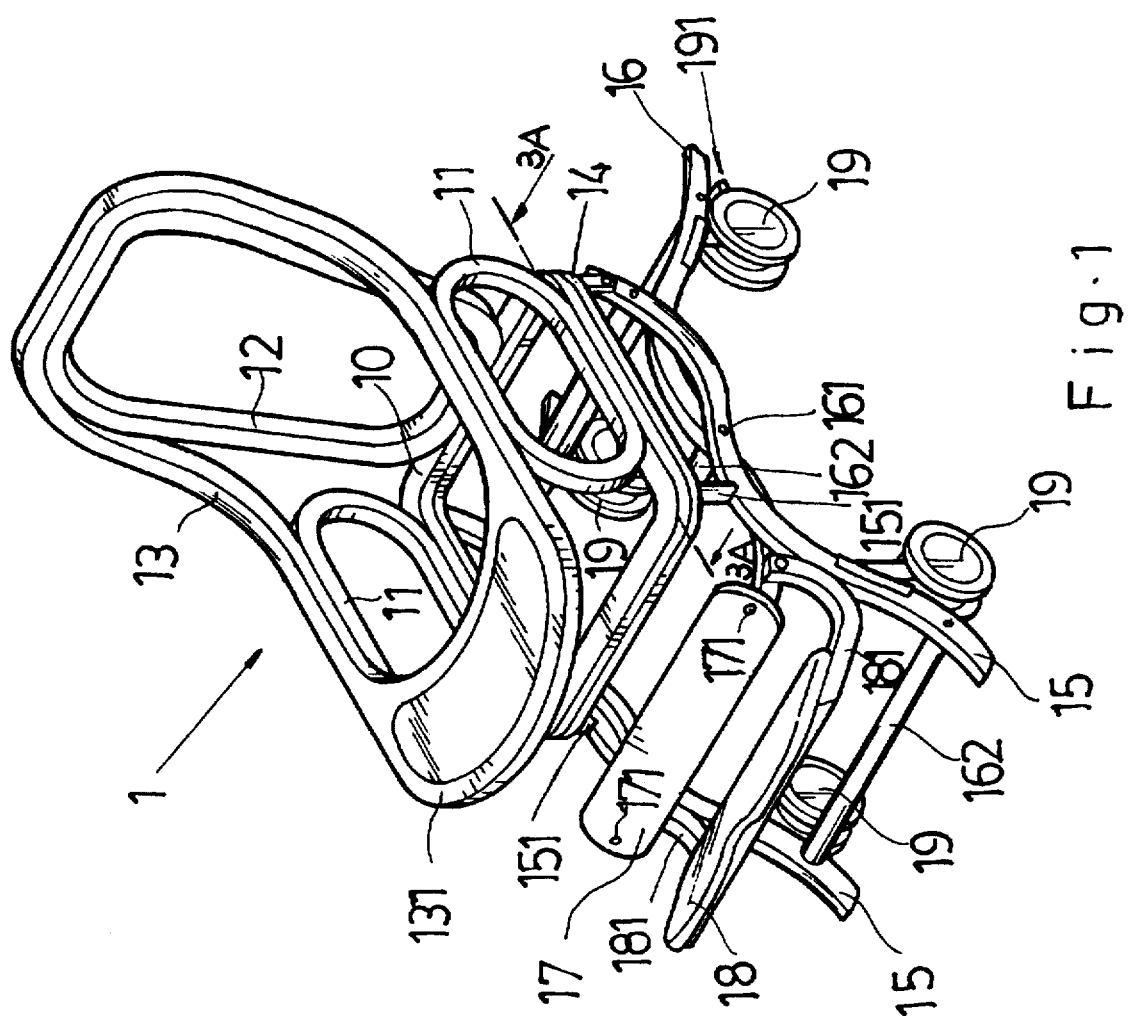
FIG. 1 is a perspective view of the children gear.
Figure 2:
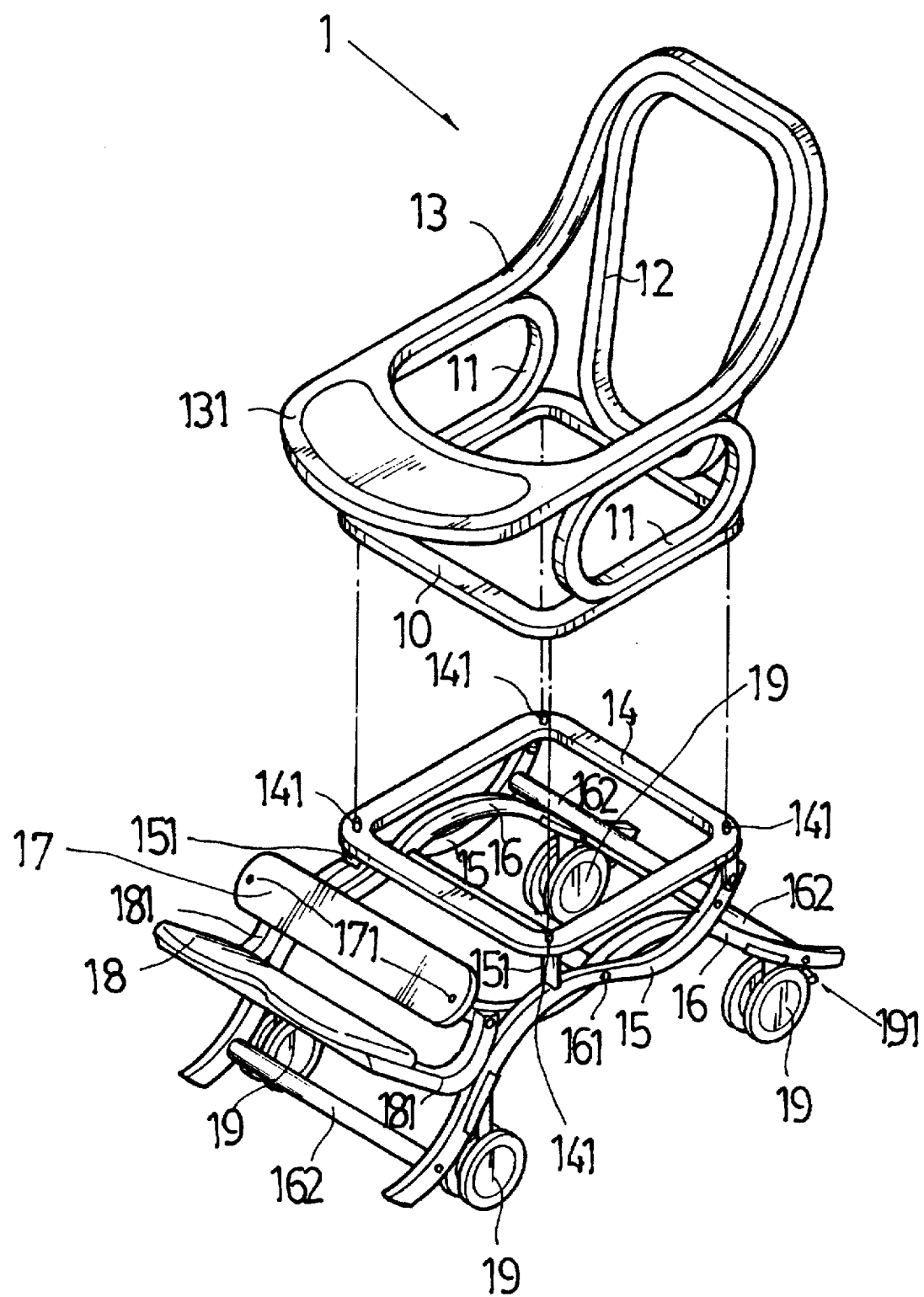
FIG. 2 is an exploded view of the children gear.

Referring to FIGS. 1 and 2, the multifunctional children's gear generally comprises a chair 1 having a rectangular cushion pad 10 at bottom. The chair 1 is provided with a pair of handrails 11 that has an olive shape and with suitable thickness. The chair 1 further includes a backrest 12 that has a reverse triangular shape. A table bracket 13 is extended horizontally from the top of the backrest 12 and it extends beyond the cushion pad 10. The table bracket 13 further includes a table 131 that is above the cushion pad 10. The table 131 further includes an olive recess for disposing food or toy thereof.

Figure 3A:
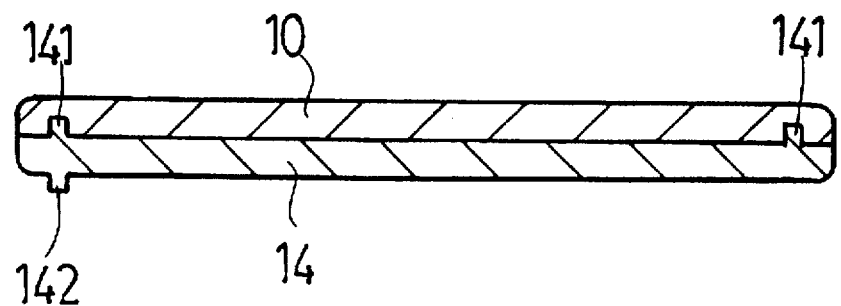
FIG. 3A is a cross sectional view taken from line 3A—3A in FIG. 1.
Figure 5:
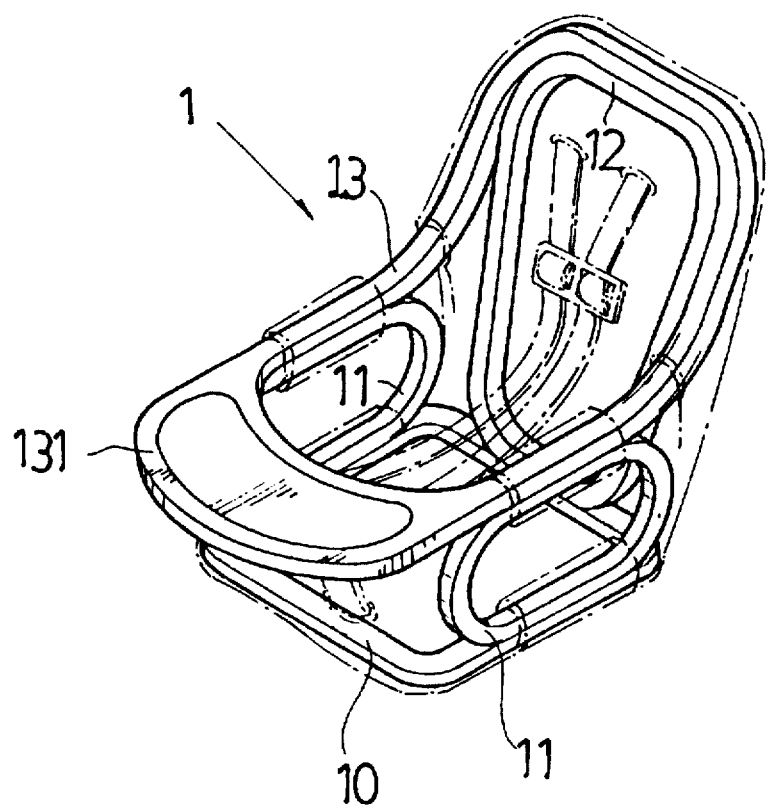
FIG. 5 is schematic illustration of another preferred embodiment.

Referring to FIG. 3, the bottom of the cushion pad 10 is provided with four receiving holes. The chair 1 further includes a supporting bracket 14 that has same dimensions with the cushion pad 10. The supporting bracket 14 further includes four dowel pins 141 that are corresponding to those receiving holes of the cushion pad. By this arrangement, the chair 1 can be fixedly attached to the supporting bracket 14 through those four receiving holes of the cushion pad 10.

The bottom of the supporting bracket 14 is provided with a pair of projected posts 142 that is also located at front side portion of the chair 1. The bottom of the supporting bracket 14 is pivotally attached with a pair of front legs 15, which has a S-shape configuration, adjacent to the ends of the backrest 12. The front legs 15 are each provided with a through hole 142. The front legs 15 are further provided with receiving post 151 that are adjacent to the projected posts 142 of the supporting bracket 14. The top of the receiving post 151 is further provided with a receiving hole such that the projected post 142 of the supporting bracket 14 can be inserted into the receiving post 151 of the front leg 15. By this arrangement, the supporting bracket 14 can be fixedly attached to the front legs 15. The bottom of the supporting bracket is mounted with a pair of rear legs 16 that has a S-shape configuration and is symmetrically to the front legs 15. The rear legs 16 are also provided with a through hole corresponding to the through hole of the front legs 15. The front edges of the rear legs 16 are respectively connected to the both ends of the fixing plate 17. The top surface of the fixing plate 17 is also provided with a pair of receiving holes 171. The rear legs 16 are pivotally attached with the top end of the J-shape handle grip 181 adjacent to the fixing plate 17 by means of a rivet. The other end of the J-shape handle grip 181 is fixedly attached to the bottom of a footrest 18.

A pair of rivets 161 is respectively passed through the through holes of the front and rear legs 15, 16 such that the front and rear legs 15, 16 are pivotally connected in a manner of scissors. The front and rear legs 15, 16 are further provided with a plurality of supporting rods 162 to increase the rigidity thereof. The bottom and inner sides of the front and rear legs 15, 16 are each respectively mounted with a wheel 19. On the other hand, the rear wheel 19 that are mounted on the rear legs 16 are mounted with a braking device 191 that has a braking lever thereof. When the braking lever is pushed downward, the rear wheel 191 is braked and can not rotate. When the braking lever is released, those four wheels 19, that are mounted onto the front and rear legs 15, 16 respectively, are free to move. Accordingly, the children's gear may serve as a stroller and move around.

The functions and the movement of the multifunctional children's gear are described as follow.

1. The children gear serves as a stroller. In this case, the baby can be readily seated onto cushion pad 10 with the legs rested or supported on the footrest 18. Accordingly, this stroller can be used on both indoors and outdoors. When the stroller is to park, the braking device 191 can be set to brake the rear wheels 19 mounted onto the rear legs 16.

Figure 4:
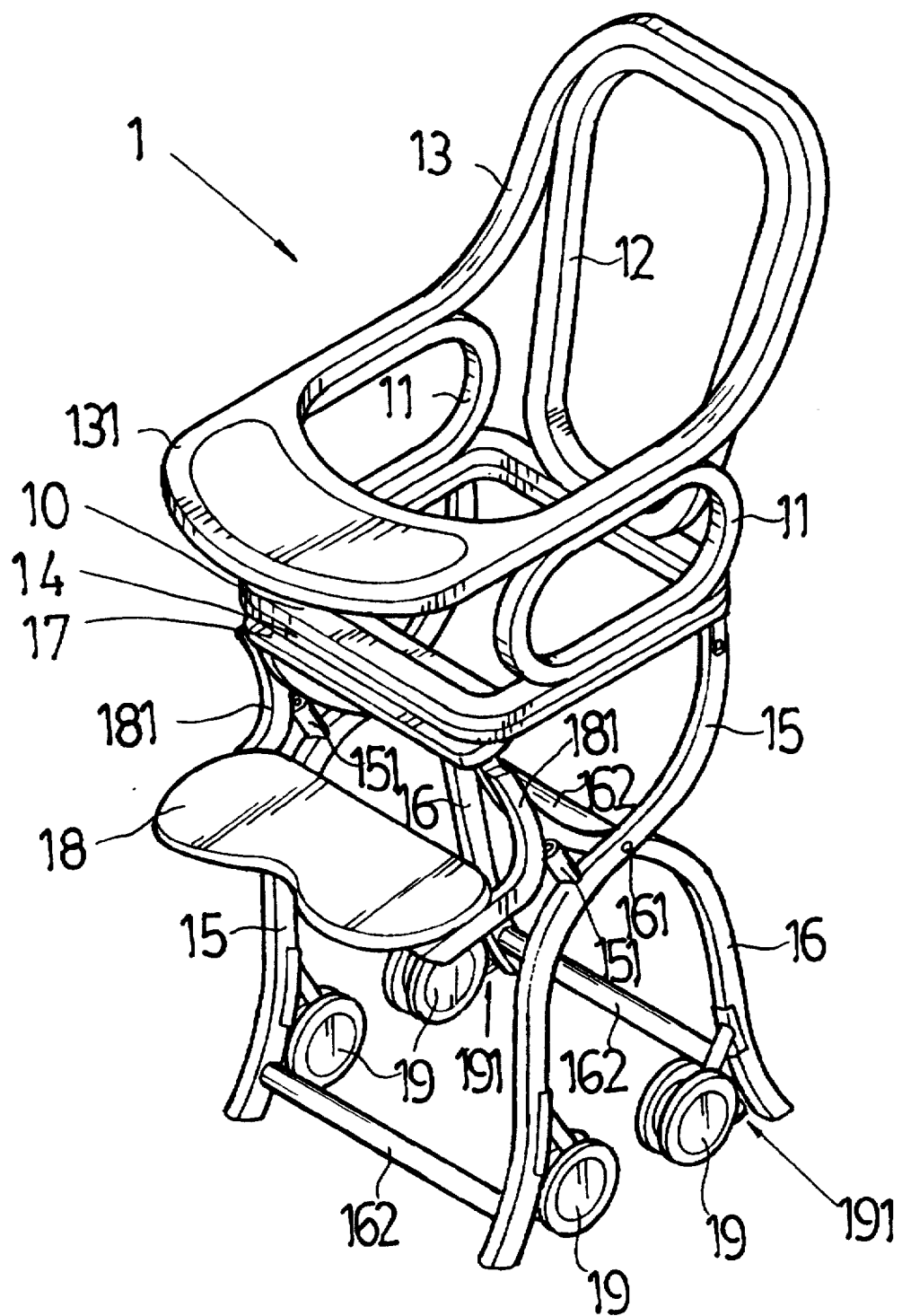
FIG. 4 is a schematic illustration of preferred embodiment.

2. The children gear serve as a table seat. Referring to FIG. 4, the supporting bracket 14 can be released from the receiving posts 151 of the front legs 15. Afterward, the front and rear legs 15, 16 can be folded together and let the receiving posts 151 of the front leg 15 be clamped between the side portion of the rear legs 16 and the J-shape handle grip 181. Meanwhile, the projected posts 142 of the supporting bracket 14 can be inserted into the receiving holes 171 of the fixing plate 17 respectively. Then the braking lever can be set downward to trigger the braking device 191 of the rear wheel 19. As a result, the rear wheels 19 are braked. In this case, the children's gear may serve as a table seat and the olive recess can be used to dispose the food or toy.

3. The children's gear may serve as car seat. The cushion pad 10 of the chair 1 can be readily removed from the dowel pins 141 of the supporting bracket 14 by applying a lifting force through the handrail 11. Then the chair 1 can be readily disposed onto the car for a car seat of a baby.

What I claim is:

1. A multifunctional childseat comprising:

a chair having a rectangular cushion pad, wherein a bottom of said cushion pad is provided with four receiving holes;

a supporting bracket including a bottom four dowel pins on a top side of the supporting bracket corresponding to said receiving holes in said cushion pad such that said chair can be fixedly attached to said supporting bracket through insertion of said dowel pins into said four receiving holes of said cushion pad, a bottom side of said supporting bracket being provided with a pair of projected posts;

a pair of front legs, each having an S-shaped configuration and being pivotally attached to the bottom of said supporting bracket by means of a fixing socket, each of said front legs being each provided with a through hole at a central portion thereof, each of said front legs being further provided with a receiving post that is adjacent to one of said projected posts of the supporting bracket, a top of said receiving post being further provided with a receiving hole such that said one of said projected posts of said supporting bracket can be inserted into said receiving hole in said receiving post of said front leg;

a pair of rear legs also having an S-shaped configuration and being arranged symmetrically with said front legs, said rear legs being provided with a through hole corresponding to said through hole in said front legs, a pair of rivets being applied to pass through said through holes of said front and rear legs such that said front and rear legs are pivotally connected together, a plurality of supporting rods being arranged onto said front and rear legs to increase rigidity of the childseat;

a fixing plate fixedly attached between the front edges of said rear legs, a top of said fixing plate being provided with a pair of receiving holes; and a pair of J-shaped handle grips pivotally connected to said rear legs in a position adjacent said fixing plate at one end and fixedly connected to a bottom side of a footrest at the other end;

wherein when said projected posts of said supporting bracket are released from said receiving posts of said front legs, said front and rear legs can be unfolded and said receiving posts of said front leg can be clamped between a side portion of said rear legs and said J-shaped handle grip while said projected posts of said supporting bracket can be inserted into said respective receiving holes of said fixing plate to form a table seat; and wherein said cushion pad of said chair can be released from said dowel pins of said supporting bracket so that said chair can be used as a car seat.

* * * * *